(12) United States Patent
Ping et al.

(10) Patent No.: US 12,393,816 B2
(45) Date of Patent: Aug. 19, 2025

(54) PRINTED FLEXIBLE RADIO FREQUENCY IDENTIFICATION (RFID) PASSIVE TEMPERATURE-MEASURING TAG BASED ON MXENE INK

(71) Applicant: ZHEJIANG UNIVERSITY, Hangzhou (CN)

(72) Inventors: Jianfeng Ping, Hangzhou (CN); Yuzhou Shao, Hangzhou (CN); Yibin Ying, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 225 days.

(21) Appl. No.: 18/560,403

(22) PCT Filed: Oct. 18, 2021

(86) PCT No.: PCT/CN2021/124489
§ 371 (c)(1),
(2) Date: Nov. 13, 2023

(87) PCT Pub. No.: WO2022/134774
PCT Pub. Date: Jun. 30, 2022

(65) Prior Publication Data
US 2024/0202486 A1    Jun. 20, 2024

(30) Foreign Application Priority Data
Dec. 25, 2020  (CN) .......................... 202011560011.7

(51) Int. Cl.
*G06K 19/077* (2006.01)
*C09D 11/30* (2014.01)
(Continued)

(52) U.S. Cl.
CPC ........ *G06K 19/07756* (2013.01); *C09D 11/52* (2013.01); *G06K 19/0717* (2013.01);
(Continued)

(58) Field of Classification Search
CPC ................................................ G06K 19/07756
See application file for complete search history.

(56) References Cited

U.S. PATENT DOCUMENTS

| 2002/0094639 A1* | 7/2002 | Reddy | ............... H10D 30/6739 438/257 |
| 2007/0007342 A1* | 1/2007 | Cleeves | .................. H10D 86/60 340/572.1 |

(Continued)

FOREIGN PATENT DOCUMENTS

| CN | 207895484 U | * | 9/2018 | ........... G06K 19/077 |
| CN | 208298231 U | | 12/2018 | |
| CN | 112733989 A | | 4/2021 | |

*Primary Examiner* — Davetta W Goins
*Assistant Examiner* — Pameshanand Mahase
(74) *Attorney, Agent, or Firm* — Bayramoglu Law Offices LLC

(57) ABSTRACT

A printed flexible radio frequency identification (RFID) passive temperature-measuring tag based on an MXene ink is provided. At room temperature, an RFID antenna is prepared by printing the MXene ink directly on different flexible substrates through extrusion printing; and an RFID temperature-measuring chip is directly connected to the RFID antenna by using the MXene ink as a binder without an additional metallic ink material such as a conductive silver paste or a binder. The MXene ink of the present disclosure has comparable physical and chemical properties such as high electrical conductivity and mechanical properties to the traditional metallic ink. Compared with an antenna printed by the traditional metallic ink, the printed RFID antenna based on the MXene ink does not require a high-temperature post-treatment after printing, has no restriction on the selection of a flexible substrate, and does not cause heavy metal pollution.

6 Claims, 2 Drawing Sheets

(51) Int. Cl.
*C09D 11/322* (2014.01)
*C09D 11/52* (2014.01)
*G06K 19/07* (2006.01)

(52) U.S. Cl.
CPC ... *G06K 19/0723* (2013.01); *G06K 19/07775* (2013.01); *G06K 19/0779* (2013.01); *G06K 19/07786* (2013.01)

(56) References Cited

U.S. PATENT DOCUMENTS

2019/0181543 A1\* 6/2019 Gogotsi ............... H01Q 1/368
2020/0235245 A1\* 7/2020 Torrisi ............... H10D 30/021

\* cited by examiner

PRINTED FLEXIBLE RADIO FREQUENCY IDENTIFICATION (RFID) PASSIVE TEMPERATURE-MEASURING TAG BASED ON MXENE INK

CROSS REFERENCE TO THE RELATED APPLICATIONS

This application is the national phase entry of International Application No. PCT/CN2021/124489, filed on Oct. 18, 2021, which is based upon and claims priority to Chinese Patent Application No. 202011560011.7, filed on Dec. 25, 2020, the entire contents of which are incorporated herein by reference.

TECHNICAL FIELD

The present disclosure relates to a temperature-measuring tag in the technical field of radio frequency identification (RFID) communication, and in particular relates to a printed flexible RFID passive temperature-measuring tag based on an MXene ink.

BACKGROUND

RFID is a non-contact automatic data acquisition and identification technology, and allows signal transmission based on an inductive coupling or electromagnetic wave manner to complete the automatic identification and positioning of a target object. RFID tags have a high information acquisition speed as the most significant characteristic, do not require mechanical or optical contact, are completed entirely based on a wireless communication technology, and lead to a high information acquisition accuracy. Moreover, if an ambient temperature sensor technology is combined with the existing RFID passive technology, an RFID passive temperature tag can be prepared, such that the remote real-time passive wireless sensing of an ambient temperature can be allowed without a battery, and acquired data can be transmitted to a reader for recording, which can meet the temperature measurement needs in various fields, and has a huge application potential in scenarios such as cold-chain processing, food preservation, and crop production.

The traditional RFID electronic tags are often prepared by technical means such as etching, electroplating, copper wire winding, and direct printing. The direct printing is considered to be an ultimate approach for reducing a cost of tag preparation. Currently, metallic conductive inks have become the most common conductive inks for printing RFID antennas due to their excellent electrical conductivity and mechanical properties. However, the metallic conductive ink also has very prominent shortcomings. For example, although a nano-silver conductive ink has excellent electrical conductivity, the price of the nano-silver conductive ink is often high. In contrast, although copper and aluminum conductive inks have a price advantage to some degree, copper and aluminum conductive inks are easily oxidized in the air to produce non-conductive oxides. In addition, these metallic conductive inks tend to require an extremely-high curing temperature (typically higher than 150° C.) after printing, which limits the selection of a flexible substrate material; and the production of these metallic conductive inks often involves a very large energy consumption and is prone to cause heavy metal pollution to the environment.

A conductive ink based on a novel two-dimensional (2D) material is considered to be a promising alternative for a metallic conductive ink. Specifically, MXene materials have become one of the most attractive and promising alternative materials in recent years due to their metal-like high electrical conductivity, large specific surface area (SSA), and outstanding mechanical properties. MXene is a novel layered 2D crystal material with a chemical formula of $M_{n+1}X_n$ (n=1, 2, or 3), where M is any one of all transition metal elements of subgroups 3 to 7 in the periodic table of elements, including lanthanides and actinides (such as Ti, Nb, Ta, Cr, V, Zn, Y, Lu, Hf, Zr, Mo, Sc, and W); and X refers to carbon, nitrogen, or both carbon and nitrogen.

Parent phase materials of MXene are a class of ternary layered compounds (chemical formula: $M_{n+1}X_n$, where A refers to an element of a main group, and Al and Si are the most common). An MXene material prepared from a parent phase material MAX has a unique 2D layered morphology, adjustable surface chemical properties, and diversified chemical compositions, which also make the MXene 2D material have excellent metallic conductivity, mechanical properties, and functional adjustability; and characteristics meeting the needs of different properties can be obtained by changing surface functional groups and adjusting chemical compositions of the surface functional groups.

An additive-free high-concentration MXene conductive ink prepared through peeling from a parent phase material MAX can exhibit extremely-high electrical conductivity (about 7,000 S/cm) and excellent mechanical properties without a high temperature treatment after direct printing. A high-concentration MXene conductive ink can be directly extruded at room temperature to print customized RFID antennas on various flexible substrates to meet the needs of different application scenarios. The direct extrusion printing has high efficiency, short production time, and high production stability. After being encapsulated, RFID passive temperature-measuring tags printed by these MXene inks have a comparable service life to traditional metal tags.

SUMMARY

In order to solve the problems and deficiencies in the background, an objective of the present disclosure is to overcome the problem that the use of a metallic conductive ink for direct printing of an RFID antenna in the prior art requires a high temperature treatment and a high material cost, and use a novel 2D nanomaterial MXene-based highly-conductive additive-free ink for printing a novel RFID passive temperature-measuring tag.

The present disclosure adopts the following technical solutions:

A printed flexible RFID passive temperature-measuring tag based on an MXene ink is provided, including an RFID antenna, an RFID temperature-measuring chip, and a flexible substrate, where at room temperature, the RFID antenna is prepared by printing the MXene ink directly on different flexible substrates through extrusion printing, and the size of the RFID antenna is adjusted and designed according to an application scenario; and the RFID temperature-measuring chip is directly connected to the RFID antenna by using the MXene ink as a binder without an additional metallic ink material such as a conductive silver paste or a binder.

The flexible substrate is a polymer flexible substrate or a common flexible substrate.

The polymer flexible substrate is one or more of polydimethylsiloxane (PDMS), polyimide (PI), polyethylene terephthalate (PET), polyvinyl alcohol (PVA), and polylactic acid (PLA).

The common flexible substrate is one or more of a paper, a fabric, and a glass sheet.

The RFID temperature-measuring chip is provided with a temperature sensor.

The MXene ink is a high-concentration, highly-conductive, and additive-free ink, and is prepared from an MXene material such as $Ti_3C_2$, $Ti_2C$, $Hf_3C_2$, $Ta_3C_2$, $Ta_2C$, $Zr_3C_5$, or $V_2C$ obtained by etching a parent phase material MAX such as $Ti_3AlC_2$, $Ti_2AlC$, $Hf_3AlC_2$, $Ta_3AlC_2$, $Ta_2AlC$, $Zr_3AlC_5$, or $V_2AlC$; and the MXene material is a 2D transition metal carbide or carbonitride, and is a novel graphene-like layered 2D crystal material with a chemical formula of $M_{n+1}X_n$, where n=1, 2, or 3.

The parent phase material MAX is a ternary layered compound with a chemical formula of $M_{n+1}X_n$, where n=1, 2, or 3; M is any one of all transition metal elements of subgroups 3 to 7 in the periodic table of elements, including lanthanides and actinides; A is an element from main group, and Al and Si are the most common; and X is at least one of carbon and nitrogen.

For example, when the MXene ink prepared in the present disclosure is $Ti_3C_2T_x(T_x=O, OH, F)$, the MXene ink is prepared by mildly etching a parent phase $Ti_3AlC_2$ with lithium fluoride (LiF) and hydrochloric acid (HCl) and peeling off.

The preparation process of the MXene ink is specifically as follows:

S1: adding 1 g of a LiF powder to 20 mL of a HCl solution with a concentration of 9 M, adding a magnetic rotor, and stirring at room temperature and a stirring rate of 500 rpm until a resulting solution is clear to obtain a mixed etchant;

S2: slowly adding 1 g of sieved $Ti_3AlC_2$ powder (greater than 400 mesh) in batches with a small amount per batch to the mixed etchant obtained in S1; and then sealing the mixed etchant after addition is completed, placing the mixed etchant in a thermostatic magnetic stirring device, and conducting an etching reaction for 24 h at 35° C. and a stirring rate of 200 rpm to obtain an etched solution;

S3: transferring the etched solution to a plastic centrifuge tube, and centrifuging the etched solution at a rotational speed of 3,500 rpm for 3 min; discarding a resulting supernatant, and collecting a resulting precipitate including both a $Ti_3C_2T_x$ sheet and a parent phase material; adding deionized water to the precipitate, and thoroughly shaking a resulting mixture to resuspend the precipitate; and repeating the centrifugation operation until a pH of a resulting supernatant reaches 6;

S4: after S3 is completed, discarding a resulting supernatant, adding deionized water to a resulting precipitate, and thoroughly shaking a resulting mixture for 20 min to separate the $Ti_3C_2T_x$ sheet in the precipitate; and centrifuging a resulting system for 30 min at a rotational speed of 3,500 rpm, and collecting a resulting supernatant, which is an MXene nanosheet solution; and S5: centrifuging the MXene nanosheet solution obtained in S4, discarding a resulting supernatant including a small-size MXene nanosheet or an impurity, and adding deionized water to a resulting precipitate to obtain an additive-free highly-conductive aqueous MXene ink with a concentration of about 60 mg/mL.

The MXene ink with a concentration of about 60 mg/mL obtained by the above method can be used to print an RFID antenna through extrusion printing on a selected flexible substrate, and then the RFID antenna is dried at room temperature to obtain a required customized RFID antenna; and after the RFID antenna is printed, an RFID temperature-measuring chip can be connected to the RFID antenna with the MXene ink at a concentration of about 60 mg/mL as a binder to finally complete the preparation of the RFID passive temperature-measuring tag, where the whole process does not require an additional metallic ink material or a binder. In addition, the above method has relatively-simple and controllable operations and a low cost; and the prepared MXene nanosheet can be stably dispersed in a liquid phase, and includes functional groups such as hydroxyl and oxyl on its surface.

The prepared RFID passive temperature-measuring tag can communicate wirelessly with a reader to reflect a temperature change in an environment in real time. The RFID passive temperature-measuring tag prepared on the flexible substrate can be tightly attached to a surface of an object to be tested, and then temperature data fed back by the RFID passive temperature-measuring tag can be acquired in real time through the reader, which can complete the real-time wireless passive temperature sensing of an environment where the object to be tested is located.

In the present disclosure, a 2D material MXene-based conductive ink with a high concentration is prepared; and a high-performance folded dipole antenna is further prepared by printing the ink on various flexible substrates through direct extrusion printing at room temperature, and in combination with the existing RFID temperature-measuring chip, flexible RFID passive temperature-measuring tags are developed, which can meet the passive wireless temperature-measuring needs in various scenarios. This research on printing dipole antennas based on the MXene ink will provide a new way for the preparation and development of RFID tags and has a huge application potential.

The printed RFID antenna based on an MXene nanomaterial does not require a high-temperature post-treatment, can be prepared on various flexible substrates, and has a comparable service life to the traditional metal antenna after being encapsulated. In addition, the preparation process of the RFID passive temperature-measuring tag is simplified, and the mass production potential of the printing technology helps to further reduce the production cost of the RFID passive temperature-measuring tag; and the RFID passive temperature-measuring tag can be prepared through quick printing after an antenna design is completed.

The present disclosure has the following beneficial effects:

1) The MXene conductive ink with a high concentration has comparable physical and chemical properties such as high electrical conductivity and mechanical properties to the traditional metallic ink, and thus is very suitable for the direct printing of an RFID antenna.

2) Compared with an antenna printed by the traditional metallic ink, the printed RFID antenna based on the MXene conductive ink does not require a high-temperature post-treatment after printing, has no restriction on the selection of a flexible substrate, and does not cause heavy metal pollution.

3) After being encapsulated, the RFID passive temperature-measuring tag prepared based on the MXene conductive ink has a comparable life span to a metal tag manufactured by the traditional process. The technology of the present disclosure can promote the development of RFID passive temperature-measuring tags in a direction of mass and intensive production.

In the figures, 1: RFID antenna, 2: RFID temperature-measuring chip, and 3: flexible substrate.

DETAILED DESCRIPTION OF THE EMBODIMENTS

To make the objectives, features, and advantages of the present disclosure apparent and comprehensible, specific implementations of the present disclosure will be described in detail below in conjunction with the accompanying drawings. Many specific details are clarified in the following description to make the present disclosure fully understood. However, the embodiments of the present disclosure are not limited to the situations described herein, and the embodiments can be designed and adjusted according to specific application scenarios and implemented and improved in other ways similar to those described herein. Therefore, the present disclosure is not limited to the specific examples disclosed below.

Figure 1:
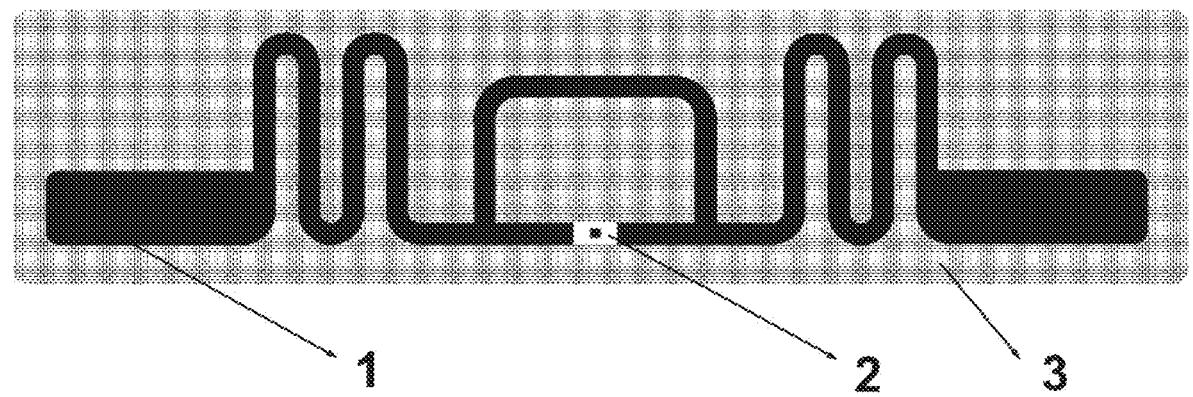
FIG. 1 is a schematic diagram of the RFID passive temperature-measuring tag prepared based on a high-concentration additive-free MXene conductive ink in the present disclosure.
Figure 2:
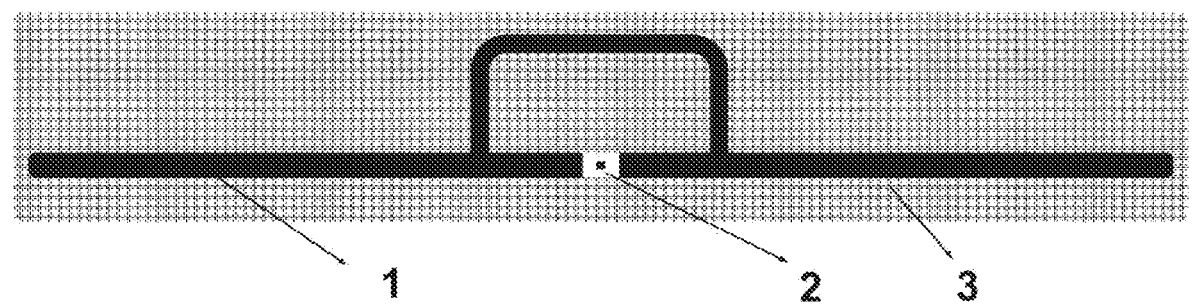
FIG. 2 is another schematic diagram of the RFID passive temperature-measuring tag prepared based on a high-concentration additive-free MXene conductive ink in the present disclosure.

As shown in FIG. 1 and FIG. 2, the present disclosure provides a printed flexible RFID passive temperature-measuring tag based on an MXene ink, including RFID antenna 1, RFID temperature-measuring chip 2, and flexible substrate 3, where at room temperature, the RFID antenna 1 is prepared by printing the MXene ink directly on different flexible substrates 3 through extrusion printing, and the size of the RFID antenna 1 is adjusted and designed according to an application scenario; and the RFID temperature-measuring chip 2 is directly connected to the RFID antenna 1 by using the MXene ink as a binder without an additional metallic ink material such as a conductive silver paste or a binder. Specifically, the MXene ink is a highly-conductive, additive-free, and high-concentration ink, and the RFID temperature-measuring chip 2 is provided with a temperature sensor.

The flexible substrate 3 may be one or more polymer flexible substrates such as PDMS, PI, PET, PVA, and PLA, and may also be one or more common flexible substrates such as paper, fabric, and glass sheet.

The MXene ink is prepared from an MXene material such as $Ti_3C_2$, $Ti_2C$, $Hf_3C_2$, $Ta_3C_2$, $Ta_2C$, $Zr_3C_5$, or $V_2C$ obtained by etching a parent phase material MAX such as $Ti_3AlC_2$, $Ti_2AlC$, $Hf_3AlC_2$, $Ta_3AlC_2$, $Ta_2AlC$, $Zr_3AlC_5$, or $V_2AlC$; and the MXene material is a 2D transition metal carbide or carbonitride, and is a novel graphene-like layered 2D crystal material with a chemical formula of $M_{n+1}X_n$, where n=1, 2, or 3.

The parent phase material MAX is a ternary layered compound with a chemical formula of $M_{n+1}X_n$, where n=1, 2, or 3; M is any one of all transition metal elements of subgroups 3 to 7 in the periodic table of elements, including lanthanides and actinides; A is an element from main group, and Al and Si are the most common; and X is at least one of carbon and nitrogen.

Figure 3:
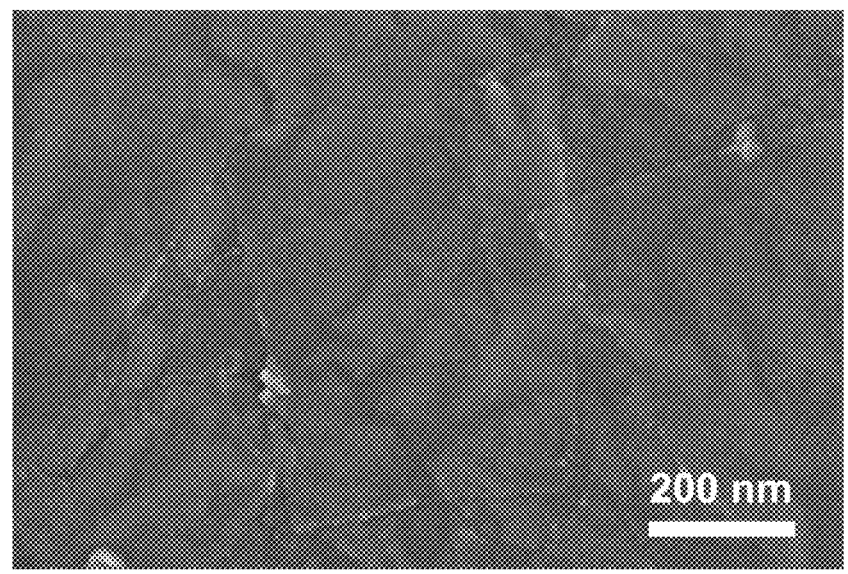
FIG. 3 is a scanning electron microscopy (SEM) image of an MXene nanosheet peeled off from an MAX phase in the present disclosure.

FIG. 3 is an SEM image of an MXene nanosheet peeled off from an MAX phase, and it can be seen from this figure that the prepared MXene ($Ti_3C_2T_x$-type) nanosheet has a regular 2D nanosheet morphology and a large sheet size (greater than 500 nm). Specifically, the MXene ink is prepared by etching a parent phase MAX and peeling off. Before an RFID antenna is printed, the MXene ink is filled into a syringe of a printer, and through a preset program, the printer can print a required RFID antenna through extrusion printing, where the printing can be conducted at room temperature without a high-temperature post-treatment. Because of the viscosity of the high-concentration MXene ink, the RFID temperature-measuring chip can be firmly connected to the printed RFID antenna without an additional conductive binder. The entire RFID passive temperature-measuring tag does not include an additional metal component, and is prepared by a simple process, which is conducive to cost reduction and mass production.

For example, when the MXene ink prepared in the present disclosure is $Ti_3C_2T_x(T_x=O, OH, F)$, the MXene ink is prepared by mildly etching a parent phase $Ti_3AlC_2$ with lithium fluoride LiF and hydrochloric acid HCl and peeling off.

The preparation process of the MXene ink is specifically as follows:

S1: 1 g of LiF powder is added to 20 mL of HCl solution with a concentration of 9 M, a magnetic rotor is added, and a resulting system is stirred at room temperature and a stirring rate of 500 rpm until a resulting solution is clear to obtain a mixed etchant;

S2: 1 g of sieved $Ti_3AlC_2$ powder (larger than 400 mesh) is slowly added in batches with a small amount per batch to the mixed etchant obtained in S1; then the mixed etchant is sealed after addition is completed, placed in a thermostatic magnetic stirring device, and subjected to an etching reaction for 24 h at 35° C. and a stirring rate of 200 rpm to obtain an etched solution;

S3: the etched solution is transferred to a plastic centrifuge tube and centrifuged at a rotational speed of 3,500 rpm for 3 min; a resulting supernatant is discarded, and a resulting precipitate including both a $Ti_3C_2T_x$ sheet and a parent phase material is collected; deionized water is added to the precipitate, and a resulting mixture is thoroughly shaken to resuspend the precipitate; and the centrifugation operation is repeated until a pH of a resulting supernatant reaches 6;

S4: after S3 is completed, a resulting supernatant is discarded, deionized water is added to a resulting precipitate, and a resulting mixture is thoroughly shaken for 20 min to separate the $Ti_3C_2T_x$ sheet in the precipitate; and a resulting system is centrifuged for 30 min at a rotational speed of 3,500 rpm, and a resulting supernatant is collected, which is an MXene nanosheet solution; and S5: the MXene nanosheet solution obtained in S4 is centrifuged, a resulting supernatant including a small-size MXene nanosheet or an impurity is discarded, and deionized water is added to a resulting precipitate to obtain an additive-free highly-conductive aqueous MXene ink with a concentration of about 60 mg/mL.

The MXene ink with a concentration of about 60 mg/mL obtained by the above method can be used to print an RFID antenna through extrusion printing on a selected flexible substrate, and then the RFID antenna is dried at room temperature to obtain a required customized RFID antenna; and after the RFID antenna is printed, an RFID temperature-measuring chip can be connected to the RFID antenna with the MXene ink at a concentration of about 60 mg/mL as a binder to finally complete the preparation of the RFID passive temperature-measuring tag, where the whole process does not require an additional metallic ink material or a binder. In addition, the above method has relatively-simple and controllable operations and a low cost; and the prepared MXene nanosheet can be stably dispersed in a liquid phase, and includes functional groups such as hydroxyl and oxyl on its surface.

The prepared RFID passive temperature-measuring tag can communicate wirelessly with a reader to reflect a temperature change in an environment in real time. The RFID passive temperature-measuring tag prepared on the flexible substrate can be tightly attached to a surface of an object to be tested, and then temperature data fed back by the RFID passive temperature-measuring tag can be acquired in real time through the reader, which can complete the real-time wireless passive temperature sensing of an environment where the object to be tested is located.

A structural design of the temperature-measuring tag is further optimized, and the design of an RFID folded dipole antenna is conducive to reducing the size of the antenna, which is suitable for some scenarios where an antenna size is limited. Through extrusion printing, the shape design of an RFID antenna can be quickly updated according to an application scenario, for example, the two designs shown in FIG. 2 and FIG. 3 can meet different size needs. A change of an RFID antenna size design will not affect the working efficiency of an RFID passive temperature-measuring tag.

A specific application implementation of an RFID passive temperature-measuring tag is as follows:

For example, an RFID passive tag prepared with a PDMS flexible substrate can be tightly attached to the surface of an object to be tested, such as the surface of human skin and the surface of plant leaf.

Figure 4:
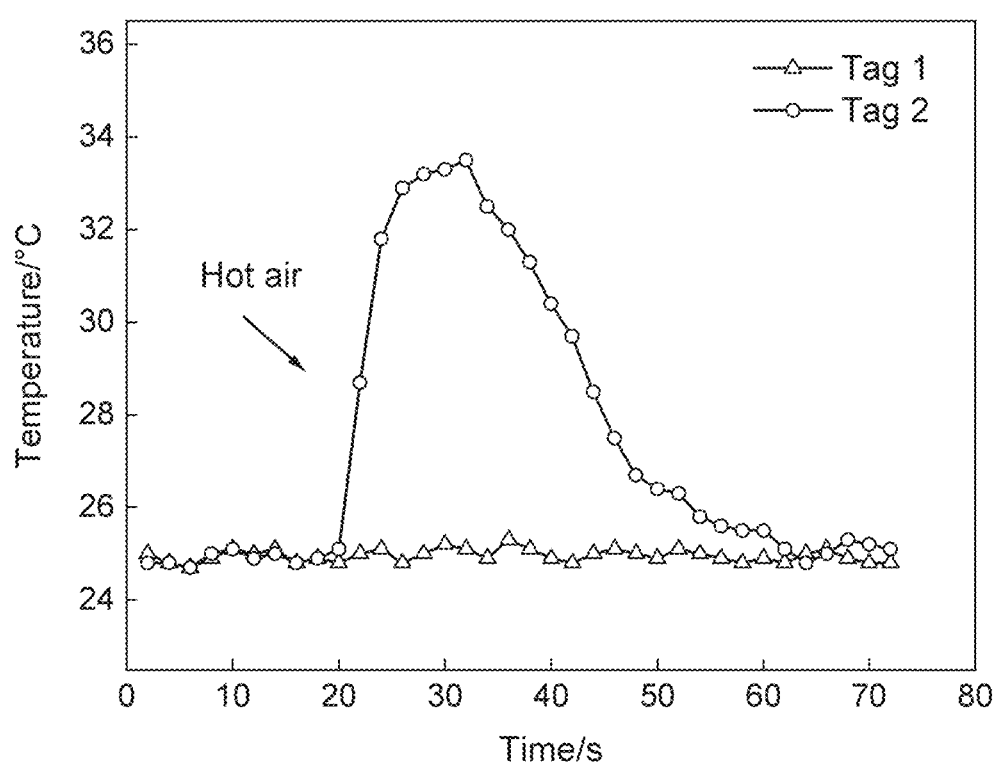
FIG. 4 shows response curves of the RFID passive temperature-measuring tags prepared based on a high-concentration additive-free MXene conductive ink in the present disclosure to a temperature change in an environment.

With the monitoring of a growth microenvironment of a plant as an example, two RFID passive temperature-measuring tags (tag 2 and tag 1) are attached to an upper leaf and a lower leaf of the plant respectively to monitor a change of a temperature microenvironment during growth of the plant. A blow dryer is used to simulate hot air in a natural environment, the hot air is applied to the upper leaf, and a resulting change of a temperature microenvironment can be accurately sensed by the RFID passive temperature-measuring tag (tag 2) attached to the upper leaf of the plant; and in contrast to a temperature value acquired by the RFID passive temperature-measuring tag (tag 1) attached to the lower leaf unaffected, the change of the temperature microenvironment of the plant can be accurately reflected. Experimental results are shown in FIG. 4.

In this embodiment, a reader in wireless communication with the RFID passive temperature-measuring tag can be a 920 MHz ultra-high frequency (UHF) temperature-measuring reader, with a large data-reading amount and a strong anti-interference ability.

Another specific application implementation of an RFID passive temperature-measuring tag is as follows:

The RFID passive temperature-measuring tag has a working distance of at least 3 m, and thus can accurately monitor the surface temperature of an object to be tested remotely. For example, an RFID passive tag prepared with a PDMS flexible substrate can be tightly attached to the forehead of a person to be tested to sense a change of the body temperature of the person to be tested. Because the RFID passive temperature-measuring tag does not require a battery to work and has a smaller size and lighter weight, it is comfortable to wear the tag, data can be accurately acquired, and the tag is suitable for large-scale monitoring of body temperatures of persons and has huge application potential in the context of previous epidemic prevention. In this embodiment, a reader in wireless communication with the RFID passive temperature-measuring tag can be a 920 MHz UHF temperature-measuring reader, with a large data-reading amount and a strong anti-interference ability.

The preferred embodiments of the present disclosure disclosed above are only provided to help illustrate the present disclosure. The preferred embodiments neither describe all details thoroughly, nor limit the present disclosure to the specific implementations. Obviously, many modifications and changes may be made based on the content of the specification. In the specification, these embodiments are selected and specifically described to well explain the principle and practical application of the present disclosure, such that a person skilled in the art can well understand and use the present disclosure. The present disclosure is only limited by the claims and a full scope and equivalents thereof.

What is claimed is:

1. A printed flexible radio frequency identification (RFID) passive temperature-measuring tag based on an MXene ink, comprising an RFID antenna, an RFID temperature-measuring chip, and a flexible substrate, wherein at room temperature, the RFID antenna is prepared by printing the MXene ink directly on different flexible substrates through extrusion printing; and the RFID temperature-measuring chip is directly connected to the RFID antenna by using the MXene ink as a binder without an additional metallic ink material or binder;

wherein the MXene ink is prepared with an MXene material obtained by etching a parent phase material MAX; and the MXene material is a two-dimensional (2D) transition metal carbide or carbonitride, and the MXene material is a graphene-like layered 2D crystal material with a chemical formula of $M_{n+1}X_n$, wherein n=1, 2, or 3.

2. The printed flexible RFID passive temperature-measuring tag based on the MXene ink according to claim 1, wherein the flexible substrate is a polymer flexible substrate or a common flexible substrate.

3. The printed flexible RFID passive temperature-measuring tag based on the MXene ink according to claim 2, wherein the polymer flexible substrate is one or more selected from the group consisting of polydimethylsiloxane (PDMS), polyimide (PI), polyethylene terephthalate (PET), polyvinyl alcohol (PVA), and polylactic acid (PLA).

4. The printed flexible RFID passive temperature-measuring tag based on the MXene ink according to claim 2, wherein the common flexible substrate is one or more selected from the group consisting of a paper, a fabric, and a glass sheet.

5. The printed flexible RFID passive temperature-measuring tag based on the MXene ink according to claim 1, wherein the RFID temperature-measuring chip is provided with a temperature sensor.

6. The printed flexible RFID passive temperature-measuring tag based on the MXene ink according to claim 1, wherein the parent phase material MAX is a ternary layered compound with a chemical formula of $M_{n+1}AX_n$, wherein n=1, 2, or 3; M is any one of all transition metal elements of subgroups 3 to 7 in the periodic table of elements, including lanthanides and actinides; A is an element from main group; and X is at least one of carbon and nitrogen.

* * * * *